United States Patent [19]

Buhrer

[11] Patent Number: 4,678,287

[45] Date of Patent: Jul. 7, 1987

[54] METHODS OF AND APPARATUS FOR TUNING A BIREFRINGENT OPTICAL FILTER

[75] Inventor: Carl F. Buhrer, Framingham, Mass.

[73] Assignee: GTE Laboratories Incorporated, Waltham, Mass.

[21] Appl. No.: 794,901

[22] Filed: Nov. 4, 1985

[51] Int. Cl.⁴ .............................................. G02B 27/28
[52] U.S. Cl. .................................................... 350/404
[58] Field of Search ................................. 350/388, 404

[56] References Cited

PUBLICATIONS

Evans, J. W., "The Birefringent Filter", Jr. Opt. Soc. America, vol. 39, 3-1949, pp. 229-242.
Title et al, "Tunable Birefringent Filters", Optical Engineering, 11/12-1981, vol. 20, pp. 815-823.
Lotspeich et al, "Electro-Optic Tunable Filter", Optical Engineering, 11/12-1981, vol. 20, pp. 830-836.
Gunning, W. J., "Electro-Optically Tuned Spectral Filters: A Review", Optical Engineering, 11/12-1981, vol. 20, pp. 837-845.
Kimura et al, "Birefringent Branching Filters for Wideband Optical FDM Communications", App. Optics, 2-1973, pp. 373-379.

Primary Examiner—William H. Punter
Attorney, Agent, or Firm—Fred Fisher

[57] ABSTRACT

The simultaneous and equal tuning of two birefringent crystal elements of a Solc type optical filter by pairs of quarter-wave plates adjacent to each and oriented such that equal and opposite physical rotations between the plates of each pair tunes its adjacent birefringent element in the same direction without changing the relative orientations of the filter input and output. Also, the simultaneous and equal tuning of two birefringent crystal elements of a Solc type optical filter by the rotation of a single contiguous group of optical components.

14 Claims, 14 Drawing Figures

METHODS OF AND APPARATUS FOR TUNING A BIREFRINGENT OPTICAL FILTER

BACKGROUND OF THE INVENTION

1. Field of the Invention

This invention relates to new and improved methods of and apparatus for tuning a birefringent optical filter and, in particular, for tuning a Solc type birefringent optical filter. Accordingly, it is a general object of this invention to provide new and improved methods and apparatus of such character.

2. General Background

Optical frequency or wavelength selective filters with exacting bandpass characteristics have been used for the isolation of spectral lines. As the optical spectrum is being used for communications channels, such filters are being adapted for the separation of optical signals from a single transmission medium such as an optical fiber. Birefringent optical filters are capable of such exacting separation of signals having closely spaced wavelengths, and their design has progressed to allow the realization of any desired periodic transmission function as well as the simple sinusoidal response obtainable with a single birefringent crystal element located between polarizers. The theory and art of such birefringent optical filters have been reviewed in some detail by A. M. Title and W. J. Rosenberg in their article, "Tunable Birefringent Filters", Optical Engineering 20 (6), pp. 815-823 (1981).

A type of birefringent filter by Ivan Solc is discussed by A. M. Title et al. in their article supra citing as a reference Solc, I., J. Opt. Soc. Am. 55, p. 621 (1965). Their article also discusses the B. Lyot filter.

Also of interest is "Electro-optically tuned spectral filters: a review", W. J. Gunning, Optical Engineering November/December 1981/Vol. 20 No. 6, pp. 837-845. Seventy eight articles are cited therein including I. Solc, "A New Type of Birefringent Filter", Czech. J. Phys. 4, 53 (1954), B. Lyot, "The Birefringent Filter and its Application in Solar Physics", Ann. Astrophys. 7,31 (1944), and J. W. Evans, "Solc Birefringent Filter", 48, 142, (1958).

The Solc filter is discussed by J. F. Lotspeich et al., "Electro-optical tunable filter", Optical Engineering November/December 1981, Vol. 20 No. 6, pp. 830-836, citing therein, Ivan Solc, 55(6), 621 (1965).

Wave plate tuning is also discussed by John W. Evans, "The Birefringent Filter", J. Optical Soc. Amer. March 1949, Vol. 39 No. 3, pp 229-242.

The Lyot-type filter consists of a serial arrangement of several single element filter sections each having a different length birefringent crystal element between polarizing filters. Each section has a sinusoidal transmission versus frequency characteristic with a different periodicity, and only those wavelengths passed by all sections reach the filter output. All the remaining light is absorbed in the several interleaving polarizers. In 1953, Ivan Solc showed that it was possible to build a birefringent filter having a periodic pulse type of narrow passband by using a series of equal length birefringent elements oriented at different angles between a single pair of input and output polarizers. The design of this Solc-type lossless sequence of elements between a single pair of polarizers was further analyzed by Harris et al., (J. Opt. Soc. Amer, 54(10), 1267-1278 (1964). They showed that it was possible to synthesize with this lossless Solc-type configuration any desired periodic transmission characteristic to a degree of accuracy dependent upon the number of equal length birefringent crystal elements used. An advantageous feature of this lossless Solc-type birefringent filter is that after passing through the input polarizer, no light is lost before the output polarizing filter. Therefore, by simply replacing this output filter with a polarizing beam splitter, both the transmission bandpass and its complement can constitute useful outputs. Such a splitting of an optical signal into two complementary outputs is the required function of an optical frequency demultiplexer, a device useful in fiber optic communications systems.

In constructing such a Solc type filter, it is desirable to prepare the birefringent crystal elements with identical lengths; otherwise, the shape of the transmission function degrades. The optical frequency periodicity depends on the crystal length, but the exact crystal length also determines the phase of the period, that is, the tuning of the passbands and stopbands in the frequency domain. Some adjustable tuning is usually required, however, and, disadvantageously, this adds to the complexity of a practical Solc type filter.

SUMMARY OF THE INVENTION

Another object of the present invention is to provide a new and improved simplified tuning mechanism for a birefringent filter that utilizes fewer optical components than corresponding devices of the prior art.

Still another object of the invention is to provide a new and improved birefringent plate tuner that simultaneously tunes two birefringent crystal elements by the same amount.

It is a further object to avoid any relative rotation of the input and output plane polarizers of the Solc-type filter resulting from the tuning process.

In accordance with one aspect of the invention, a method of simultaneous and equal tuning of two birefringent elements in a birefringent optical filter having birefringent elements and wave plates oriented along its optical axis, includes rotation of a single contiguous group of all optical birefringent elements and wave plates, between two points along the axis, about the axis. One point is positioned between two quarter-wave plates immediately adjacent one birefringent element. The second point is positioned between two other quarter-wave plates immediately adjacent the other birefringent element. In accordance with certain features of the invention, the quarter-wave plates may precede or follow, respectively or not, the birefringent elements. The first quarter-wave plate can have its fast axis oriented at an angle of 45 degrees less, or greater, than the orientation of the fast axis of one birefringent element. The second quarter-wave plate has its fast axis oriented at an angle of 45 degrees greater, or less, respectively, than that of the one birefringent element. The third and fourth quarter-wave plates are oriented with their fast axes oriented at angles of 45° greater and less, respectively, and less and greater, respectively, than the orientation of the fast axis of the second birefringent element.

In accordance with another aspect of the invention, a tunable birefringent optical filter includes, in orientation along an optical axis, an input polarizer, a number of pairs of birefringent elements, an adjacent pair of quarter-wave plates adjacent each birefringent element, an output polarizer, and means for tuning the birefringent optical filter by rotating a number of pairs of birefringent elements with respect to quarter-wave plates equal to the number of pairs of birefringent elements between the polarizers.

The invention can include a tunable birefringent optical filter having, in serial relation along an optical axis, an input polarizer, a first quarter-wave plate, a half-wave plate, a second quarter-wave plate, a first birefringent element, a second birefringent element, a third quarter-wave plate, a combination of a fourth quarter-wave plate and a fifth quarter-wave plate, a sixth quarter-wave plate, a combination of a fourth birefringent element and a fifth birefringent element having their fast axes at equal orientation angles, an output polarizer, and means for rotating said half-wave plate about said optical axis and for rotating said combination of fourth and fifth quarter-wave plates about said optical axis.

BRIEF DESCRIPTION OF THE DRAWINGS

Other objects, advantages, and features of this invention, together with its construction and mode of operation, will become more apparent from the following description, when read in conjunction with the accompanying drawing, in which.

FURTHER BACKGROUND

Figures 1, 2:
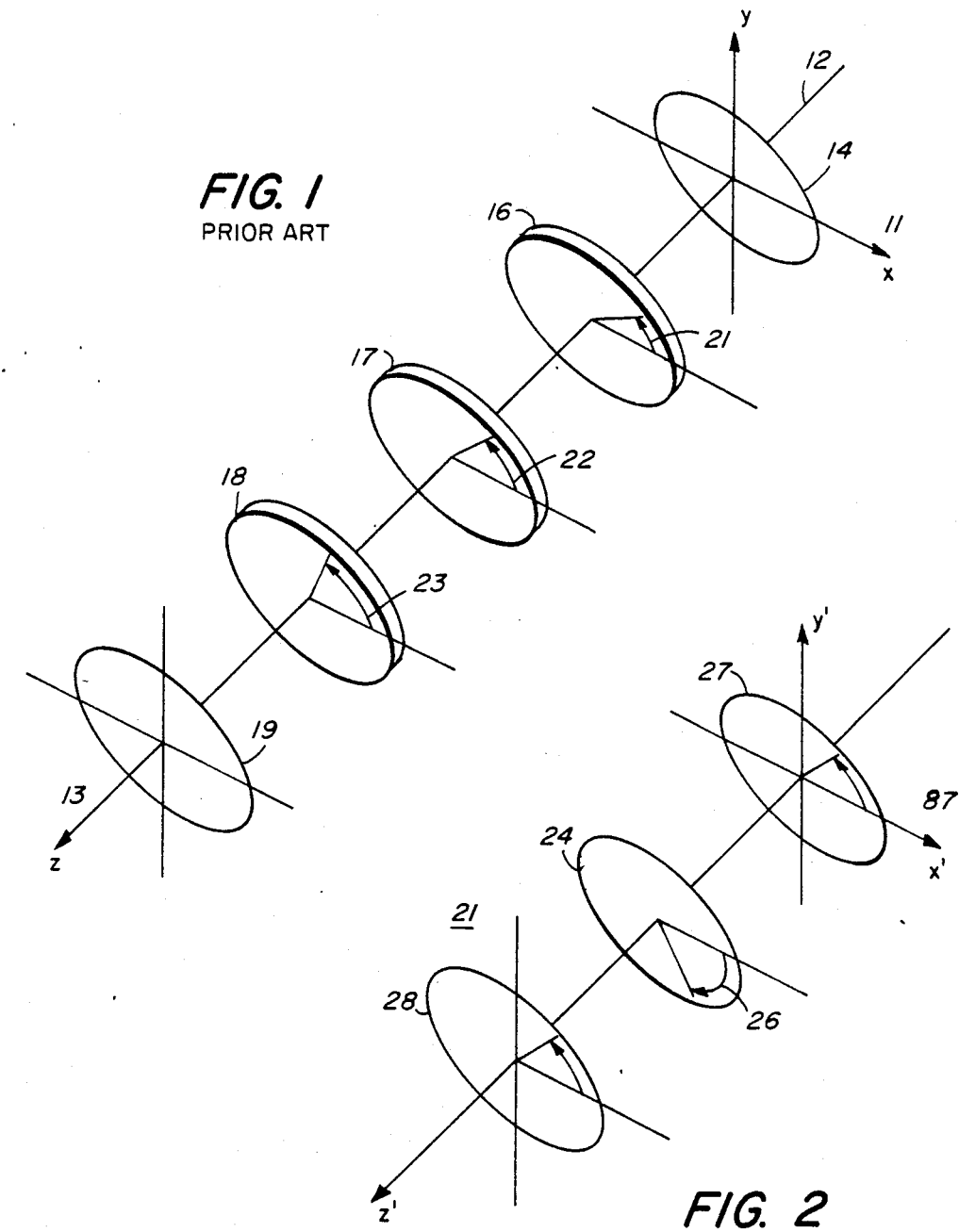
FIG. 1 is a representation of a basic Solc type birefringent filter of the prior art.
FIG. 2 illustrates a set of three retardation plates that is added to each of the birefringent crystal elements of the basic Solc filter shown in FIG. 1, in accordance with the prior art.

To facilitate a comprehension of the instant invention, further background is given of a Solc type birefringent filter. The basic configuration of a Solc type birefringent filter is shown in FIG. 1. An input light beam 12 travelling along the Z axis of the filter passes through an input polarizer 14 where it is polarized parallel to the x coordinate axis. It then passes sequentially at normal incidence through a series of birefringent crystal elements 16, 17, and 18 and exits through an output polarization filter 19 which is oriented with its polarization axis set at an angle measured from the x axis toward the y axis. The birefringent crystal elements 16, 17 and 18 are parallel plates of a birefringent material, such as calcite or quartz, cut such that the optic axis of the crystal is perpendicular to the plate normal. The direction of the optic axis in the plane of the plate defines the fast axis of its birefringence for a uniaxial negative crystal such as calcite or the slow axis of its birefringence for a uniaxial positive crystal such as quartz. In either case, the fast and slow axes of a crystal plate are mutually perpendicular.

Each birefringent crystal element has a specific rotational orientation about the Z axis, with the angles 21, 22, and 23 between their fast axes and the x axis, and the orientation of the output polarizer 19, selected to give the desired transmission function. The procedures devised for computing these angles have been reviewed in the above-mentioned article by Harris et al.

In order to tune a birefringent filter so as to shift its periodic transfer function in frequency, without changing its shape, it is believed necessary to change the effective birefringence of each identical crystal element by an equal amount. The configuration of three retardation plates shown in FIG. 2 is often used for this purpose. A half-wave plate 24 with its fast axis oriented at an angle 26 equal to $-45°+\Delta$ is positioned between two quarter-wave plates 27 and 28 with their fast axes oriented at $+45°$ relative to a common x' axis. This combination 21 is equivalent to a single retardation plate oriented with its fast axis parallel to the x' axis and with retardation $\delta = 4\Delta$.

Figure 7:
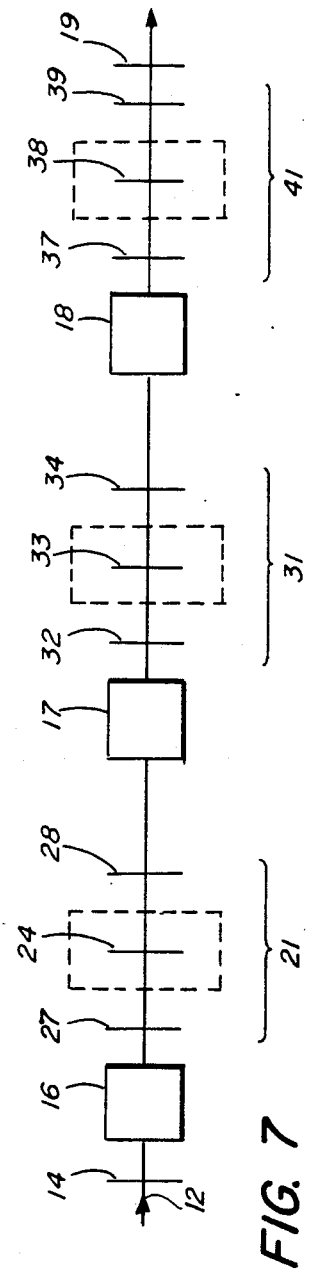
FIG. 7 depicts a Solc type birefringent filter configuration tuned by three three wave plate tuners according to the prior art.

To tune the basic Solc filter of FIG. 1 according to the prior art, a set of three retardation plates, as shown in FIG. 2, are added to each of the birefringent crystal elements as illustrated by the schematic diagram of FIG. 7. An input light beam 12 travels from left to right (as viewed in the drawing) through an input polarizer 14 and a series of birefringent crystal elements and tuning plate triads before reaching the output polarization filter 19. Relative to the orientation of the axis of the input polarizer, which is taken to be zero degrees and the x axis, the birefringent crystal elements 16, 17, and 18 and the output polarizer 19 are oriented with their fast axes at angles $\theta_1$, $\theta_2$, $\theta_3$, and $\theta_4$ as computed by design using the procedure given by Harris et al. A tuning plate set 21 consisting of thin retardation plates 27, 24, and 28 configured as shown in FIG. 2 is oriented with its x' axis at the same angle $\theta_1$ as the fast axis of the preceding birefringent crystal element 16 that it tunes. In this way, the variable birefringent plate equivalent to the set 21 has its fast axis aligned with that of the crystal element 16 and serves to increase or decrease its birefringence. Similarly, the tuning plate sets 31 and 41 are oriented with their x' axis at angles $\theta_2$ and $\theta_3$.

A Solc type birefringent filter configuration as depicted in FIG. 7 can be tuned by rotating half wave plates 24, 33, and 38 by equal angles $\Delta$ so that all birefringent crystal elements are tuned synchronously. The periodic transfer function moves through one full period as the equivalent retardation $\delta$ of each tuning plate set varies through 360°. Since $\delta = 4\Delta$ this occurs when $\Delta$ is rotated through 90°.

Prior art Solc type birefringent filters with waveplate tuning as depicted in FIG. 7 become increasingly complex as the number of birefringent crystal elements increases. It is a further object of the present invention to both reduce the number of waveplates required and to provide for one tuner to simultaneously tune two birefringent crystal elements.

Figures 3, 4:
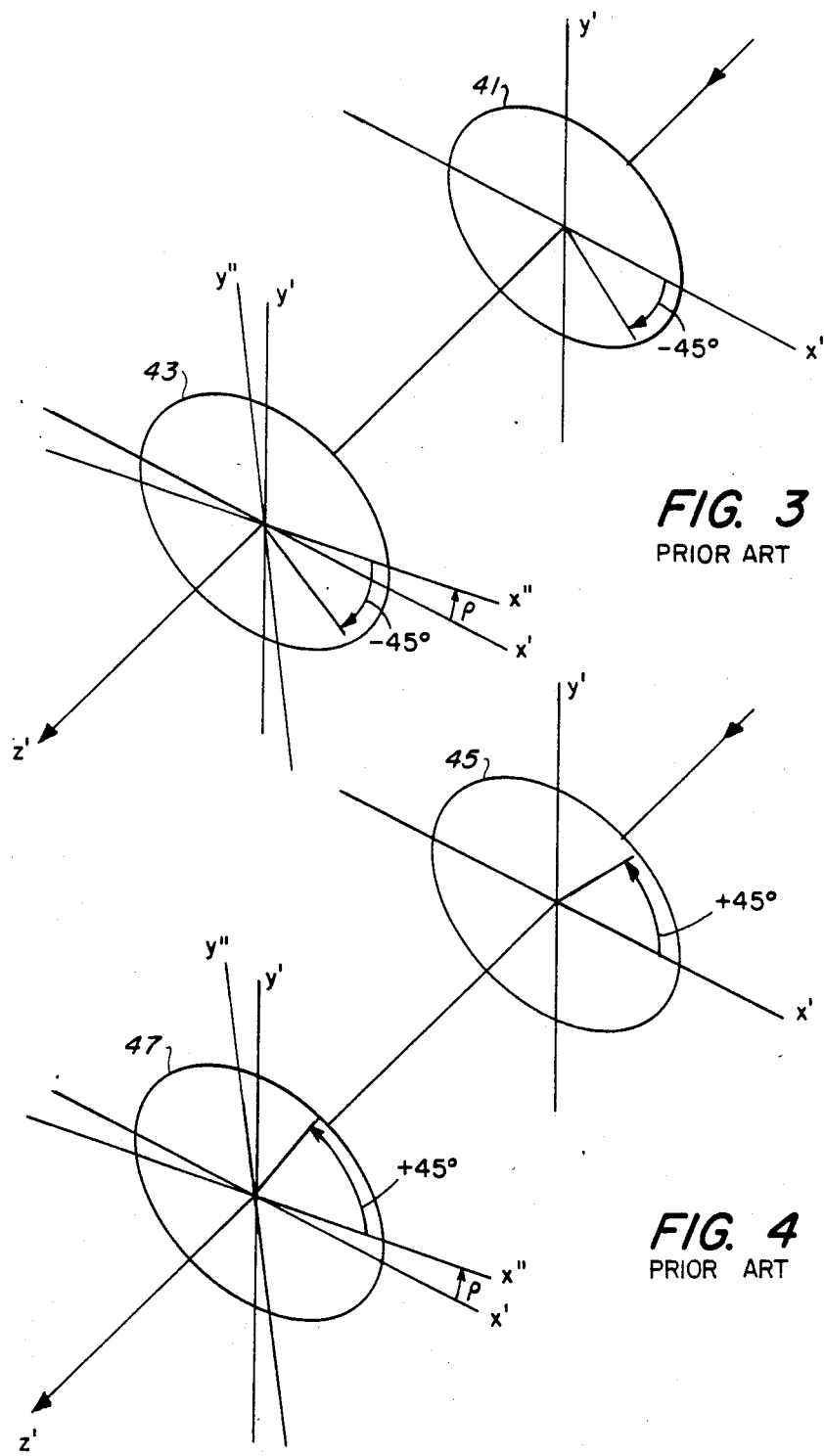
FIG. 3 is a two retardation plate tuner of the prior art as described by John W. Evans.
FIG. 4 is an alternative two retardation plate tuner.

The three plate tuner of FIG. 2 along with a simpler two plate tuner was first described by John W. Evans (J. Optical Soc. Amer, 39(3), 229–242 (March 1949)). His two plate tuner is shown in FIG. 3. A first quarter-wave plate 41 is oriented with its fast axis at an angle of $-45°$ from the x' coordinate axis of the input, while a second quarter-wave plate 43 with its fast axis at an angle of −45° from the x" coordinate axis of the output, and the latter is rotated in the positive direction from the x' axis toward the y' axis by an angle ρ. Tuning is achieved by rotating the second plate relative to the first by varying the angle ρ and with it the relative orientation of the output and input system of axes. A similar configuration shown in FIG. 4 has two quarter-wave plates 45 and 47 oriented with their fast axes at an angle of +45° from the x' and x" axes, respectively. At the zero tuning point, when ρ=0, the two quarter-wave plates combine to give a half-wave plate with its fast axis at −45° for the configuration of FIG. 3 or with its fast axis at +45° for the configuration of FIG. 4. As ρ is increased, the birefringent retardation produced by the tuning appears with its fast axis along the x' direction and with a retardation value of $\delta = \pm 2\rho$. The sign of the effect depends upon whether it is assumed to precede or follow the above-described half-wave of birefringence with its axes at ±45°, and whether the plates are configured as in FIG. 3 or FIG. 4.

The principal disadvantage of the two plate tuner is that the coordinate axes of its output rotate with the second quarter-wave plate as ρ is varied for tuning.

DESCRIPTION OF PREFERRED EMBODIMENTS

Tuned filter configurations described hereinafter are simplified because pairs of birefringent crystal elements are tuned with only two quarter-wave plates per birefringent crystal element used in such a way that there is no net rotation of the filter output polarizer relative to the input polarizer during the tuning process.

In the present invention, a couple of two plate tuners is used as a complementary pair to simultaneously tune two of the identical length birefringent crystal elements of a lossless Solc-type birefringent filter, such that a tuning angle ρ in one two-plate tuner is compensated by a tuning angle of −ρ in a second two plate tuner at another point along the optical system. In this way, no net rotation of the output polarizer axis results relative to the input polarizer axis, as the pair of tuners is varied. This is an especially important consideration if the input and/or output polarizers are actually polarizing beam splitters as any net rotation would affect the beam coupling geometry.

Figure 5:
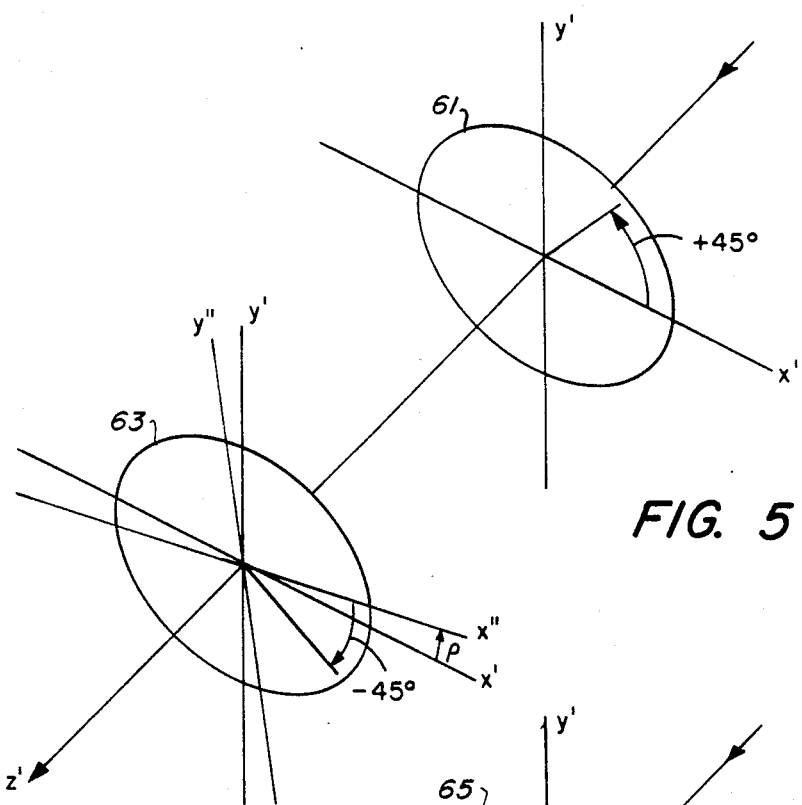
FIGS. 5 and 6 depict a complementary pair of two quarter-wave retardation plate tuners useful for the present invention.
Figure 6:
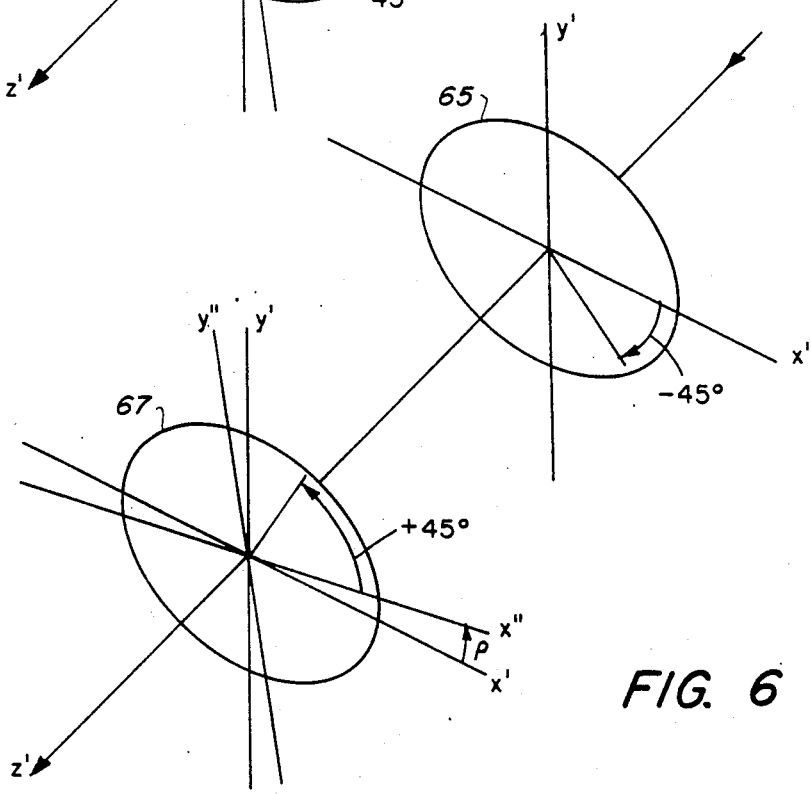

The couple of two plate tuners must be complementary in the sense that equal and opposite rotational angles +ρ and −ρ in the couple must produce the same polarity of birefringent effect to be added to the two birefringent crystal elements of the Solc-type filter with which they are associated for tuning. The two plate tuners of FIG. 3 and FIG. 4 are complementary in this sense, but their effect includes that of a half-wave plate resulting from the fact that at the zero tuning angle ρ=0, the two quarter-wave plates comprising them have their fast axes parallel. A preferred complementary pair of two plate tuners for the present invention is shown in FIG. 5 and FIG. 6. At ρ=0 the fast axes of the quarter-wave plate in these tuners are orthogonal so that the net birefringent effect is zero. As the second plate is rotated, each tuner simulates a single birefringent plate having its fast axis along the x' axis and with a retardation value of $\delta = +2\rho$ for the configuration of FIG. 5 and $\delta = -2\rho$ for the configuration of FIG. 6.

The optical properties of the two plate tuner configurations of FIG. 5 and FIG. 6 are derived using the matrix notation of R. C. Jones (J. Opt. Soc. Amer, (31(7), 488–493 (July 1941)). A quarter-wave plate with fast axis at +45° such as 61 of FIG. 5 or 67 of FIG. 6 has a Jones matrix equal to $$\frac{\sqrt{2}}{2}\begin{pmatrix} 1 & j \\ j & 1 \end{pmatrix}$$

while a quarter-wave plate with fast axis at −45° such as 63 of FIG. 5 or 65 of FIG. 6 has a Jones matrix equal to $$\frac{\sqrt{2}}{2}\begin{pmatrix} 1 & -j \\ -j & 1 \end{pmatrix}$$

The coordinate transformation to the x", y" system of axes from the x', y' system is equivalent to that of an optical rotor of angle −ρ the Jones matrix of which is $$\begin{pmatrix} \cos\rho & \sin\rho \\ -\sin\rho & \cos\rho \end{pmatrix}$$

Multiplying these matrices for the configuration of two plate tuner of FIG. 5 yields $$\frac{\sqrt{2}}{2}\begin{pmatrix} 1 & -j \\ -j & 1 \end{pmatrix} \begin{pmatrix} \cos\rho & \sin\rho \\ -\sin\rho & \cos\rho \end{pmatrix} \frac{\sqrt{2}}{2}\begin{pmatrix} 1 & j \\ j & 1 \end{pmatrix} = \begin{pmatrix} e^{+j\rho} & 0 \\ 0 & e^{-j\rho} \end{pmatrix}$$

while the configuration of two plate tuner of FIG. 6 gives $$\frac{\sqrt{2}}{2}\begin{pmatrix} 1 & j \\ j & 1 \end{pmatrix} \begin{pmatrix} \cos\rho & \sin\rho \\ -\sin\rho & \cos\rho \end{pmatrix} \frac{\sqrt{2}}{2}\begin{pmatrix} 1 & -j \\ -j & 1 \end{pmatrix} = \begin{pmatrix} e^{-j\rho} & 0 \\ 0 & e^{+j\rho} \end{pmatrix}$$

Since the Jones matrix of a retardation plate of phase difference δ with its fast axis along the x' axis is $$\begin{pmatrix} e^{+j\delta/2} & 0 \\ 0 & e^{-j\delta/2} \end{pmatrix}$$

it follows that these two plate tuners are equivalent to a tunable birefringence with fast axis along x' and with phase difference $\delta = +2\rho$ for the configuration of FIG. 5 and $\delta = -2\rho$ for the configuration of FIG. 6.

Similar analyses of the two plate tuner configurations of FIG. 3 and FIG. 4 give more complex results that can be interpreted as a combination of a tuned birefringence with $\delta = \pm 2\rho$ as above, and a half wave plate with fast axis at ±45°. For the configuration of FIG. 3 the result is $$\begin{pmatrix} e^{+j\rho} & 0 \\ 0 & e^{-j\rho} \end{pmatrix} \begin{pmatrix} 0 & -j \\ -j & 0 \end{pmatrix} =$$

$$-j\begin{pmatrix} 0 & e^{+j\rho} \\ e^{-j\rho} & 0 \end{pmatrix} = \begin{pmatrix} 0 & -j \\ -j & 0 \end{pmatrix}\begin{pmatrix} e^{-j\rho} & 0 \\ 0 & e^{+j\rho} \end{pmatrix}$$

while for the configuration of FIG. 4 the result is $$\begin{pmatrix} e^{-jp} & 0 \\ 0 & e^{+jp} \end{pmatrix} \begin{pmatrix} 0 & j \\ j & 0 \end{pmatrix} =$$

$$+j \begin{pmatrix} 0 & e^{-jp} \\ e^{+jp} & 0 \end{pmatrix} = \begin{pmatrix} 0 & j \\ j & 0 \end{pmatrix} \begin{pmatrix} e^{+jp} & 0 \\ 0 & e^{-jp} \end{pmatrix}$$

The middle of the above two equations is the result of multiplying the Jones matrices of the quarter-wave plates and the transformation matrix. The left side represents an interpretation of the result in terms of a tuned birefringence following a half-wave plate, while the right side represents an interpretation of the result in terms of a tuned birefringence preceding a half-wave plate. The Jones matrices of such half-wave plates with fast axes at ±45° are $$\begin{pmatrix} 0 & -j \\ -j & 0 \end{pmatrix} \text{ for } -45° \quad \begin{pmatrix} 0 & j \\ j & 0 \end{pmatrix} \text{ for } +45°$$

In summary, both the complementary pair of two plate tuners of FIGS. 3 and 4 and the complementary pair of two plate tuners of FIGS. 5 and 6 are useful for the present invention, but the latter pair is advantageous because its effect is simply equivalent to a single tuned birefringent plate with fast axis along the x' axis, while the former would require revision of the geometry of the lossless Solc-type filter to which they were applied in order to accommodate the additional half waves of retardation that they would introduce.

Figure 8:
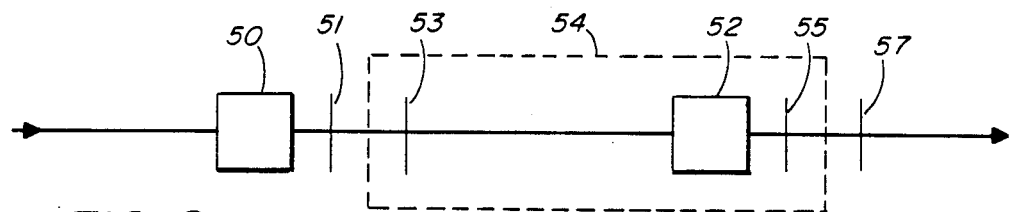
FIGS. 8, 9, 10, and 11 depict the tuning of a pair of birefringent crystal elements by two complementary pairs of two plate tuners according to the present invention.
Figure 9:
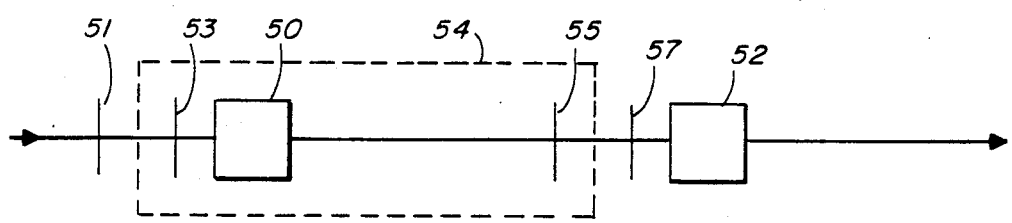
Figure 10:
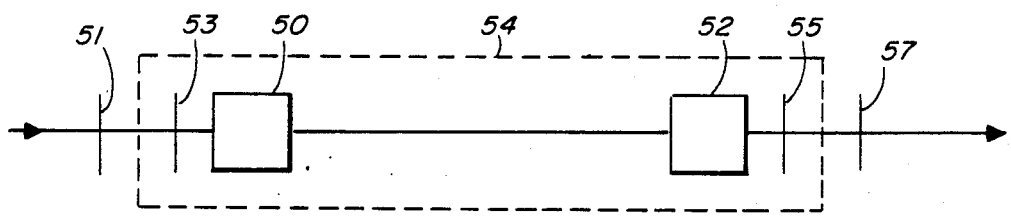

The incorporation of a couple of two plate tuners into a lossless Solc-type birefringent filter will now be considered. Each tuner of a complementary pair preferably configured as in FIGS. 5 and 6 is located adjacent to one of the two birefringent crystal elements that the pair is to tune. Both may follow their associated birefringent crystal element as in FIG. 8, both may precede their associated birefringent crystal element as in FIG. 9, or one may precede and one may follow its associated birefringent crystal element as in FIGS. 10 and 11. In all cases, the coordinate axes x' or x" adjacent to the birefringent crystal element must be oriented parallel to the fast axis of that element. All figures show birefringent crystal element 50 with its fast axis at an angle of $\theta_n$ and birefringent crystal element 52 with its fast axis at an angle of $\theta_{n+1}$. These angles are determined by the synthesis technique given by Harris et al. to achieve the desired filter characteristic. Adjacent to 50 are quarter-wave plates 51 and 53 configured as in FIG. 5 with their fast axes at angles of $\theta_n+45°$ and $\theta_n-45°$ respectively. Adjacent to 52 are quarter-wave plates 55 and 57 configured as in FIG. 6 with their fast axes at angles of $\theta_{n+1}-45°$ and $\theta_{n+1}+45°$ respectively. Simultaneous tuning of birefringent crystal elements 50 and 52 is achieved by rotating through a positive angle $\rho$ all birefringent crystal elements and/or quarter-wave plates within the dashed box 54. This gives a rotational angle $\rho$ between plates 51 and 53 and $-\rho$ between plates 55 and 57. Because of the complementary nature of the configurations in FIGS. 5 and 6, an additional phase change of $\delta=2\rho$ is added to both birefringent crystal elements 50 and 52.

The tuning of lossless Solc-type birefringent filters with n pairs of birefringent elements is therefore achievable with n couples of complementary configured two plate tuners such as shown in FIGS. 5 and 6. Any odd element may be tuned with the three plate tuner of FIG. 2, but it is noted that the tuning rate relative to $\Delta$ for the three plate tuner is twice the tuning rate relative to $\rho$ for the two plate tuners. This is because the three plate tuner may be considered to be a special case of the complementary pair of two plate tuners of FIGS. 5 and 6 being used together with quarter-wave plate 65 immediately following quarter-wave plate 63 and with their axes coincident. Together, the two quarter-wave plates 63 and 65 are equivalent to the one half-wave plate 24, while the quarter-wave plates 61 and 67 are equivalent to the quarter-wave plates 27 and 28 of FIG. 2. Rotation of quarter-wave plates 63 and 65 together by $\rho=\pm\Delta$ makes available a doubled birefringent effect $\delta=4\rho=4\Delta$, but it may be applied to only one birefringent crystal element of the Solc-type filter because of the imposed coincidence of the fast axes of quarter-wave plates 63 and 65.

Figure 11:
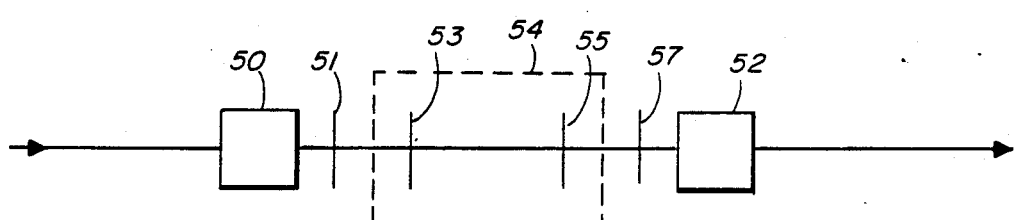

As a specific example of the application of a couple of complementary configured two plate tuners, a specific filter design is hereafter described. Consider the transmission function 90 of FIG. 13. It is designed to serve as the basis of a wavelength demultiplexer device that separates fiber optic signals at 1.30 μm and 1.32 μm. A five birefringent crystal element lossless Solc-type filter is designed using quartz crystal elements 4.6065 mm long. Relative to the input polarizer angle at 0°, the crystals are to be oriented with their fast axes at $\theta_1=+45°, \theta_2=\theta_3=-15°$, and $\theta_4\theta_5=+10°$. The output polarizer is at $\theta_6=0°$. As there are two pairs of identically oriented adjacent birefringent crystal elements, the two pairs can be tuned by a couple of complementary two plate tuners. The preferred configuration of FIG. 11 is used because only the two plates within dashed box 54 need to be rotated for tuning. The complete five birefringent crystal element lossless Solc-type filter with its tuning plates is shown in FIG. 12.

The five quartz crystal birefringent elements 16, 17, 18, 26 and 27 are located along an optical system axis between plane polarizers 14 at the input and 19 at the output. Both polarizers are oriented at 0° so as to pass light polarized along the x axis. The fast axis of the element 16 is at $\theta_1=+45°$, the fast axes of the element 17 and 18 are at $\theta_2=\theta_3=-15°$, while the fast axes of the element 26 and 27 are at $\theta_4=\theta_5=+10°$. Crystal elements pairs 17 and 18 and 26 and 27 may advantageously be constructed as single crystals 48 and 49 having twice the length of crystal element 16. Since double birefringent crystal elements 48 and 49 are of equal length, they may be simultaneously tuned by a couple of complementary configured two plate tuners. Quarter-wave plates 51 and 53 configured as in FIG. 5 are oriented at angles of $\theta_3+45°$ and $\theta_3-45°$ respectively, while quarter-wave plates 55 and 57 configured as in FIG. 6 are oriented at angles of $\theta_4-45°$ and $\theta_4+45°$ respectively. Single birefringent crystal element 16 is preceded by the three plate tuner configuration of FIG. 2. Plates 27, 24, and 28 are oriented at angles of $\theta_1+45°$, $\theta_1-45°$ and $\theta_1+45°$, respectively, but since $\theta_1=45°$, the plate 27 has a principal axis (its slow axis) parallel to that of the adjacent input polarizer and is therefore superfluous. Its omission from FIG. 12 is made possible because the three plate tuner precedes birefringent crystal element 16 that it tunes and because the specific filter design requires that $\theta_1=45°$.

Figure 12:
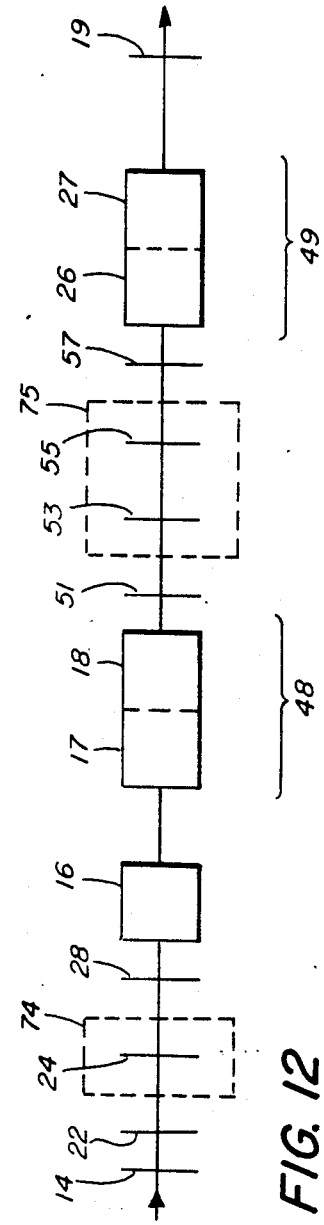
FIG. 12 depicts a five element birefringent filter with two double birefringent elements tuned according to the present invention.

Synchronous tuning of all five birefringent crystal elements 16, 17, 18, 26, 27 of the lossless Solc-type filter of FIG. 12 requires that the double birefringent crystal elements 48 and 49 receive twice the added retardation as the single element 16. If half-wave plate 24 in dashed box 74 is rotated through an angle $\Delta$ the birefringence added to element 16 is $\delta=4\Delta$. To get twice this amount added to each of double elements 48 and 49, quarter-wave plates 53 and 55 in dashed box 75 must be rotated through an angle $\rho=4\Delta$ since for the two plate tuner configurations $\delta=2\rho$. The design and tuning angles of the filter shown in FIG. 12 are summarized in Table I.

TABLE I

Angular Configuration of Tuned Filters of FIG. 12

| COMPONENT | DESCRIPTION | ORIENTATION OF FAST AXIS |
|---|---|---|
| 14 | Input polarizer | 0° |
| 22 | Quarter-wave plate | 90° |
| 24 | Half-wave plate | $\Delta$ |
| 28 | Quarter-wave plate | 90° |
| 16 | First birefringent crystal element | 45° |
| 17 | Second birefringent crystal element | −15° |
| 18 | Third birefringent crystal element | −15° |
| 51 | Quarter-wave plate | +30° |
| 53 | Quarter-wave plate | −60° + 4$\Delta$ |
| 55 | Quarter-wave plate | −35° + 4$\Delta$ |
| 57 | Quarter-wave plate | +55° |
| 26 | Fourth birefringent crystal element | +10° |
| 27 | Fifth birefringent crystal element | +10° |
| 19 | Output polarizer | 0 |

Figure 13:
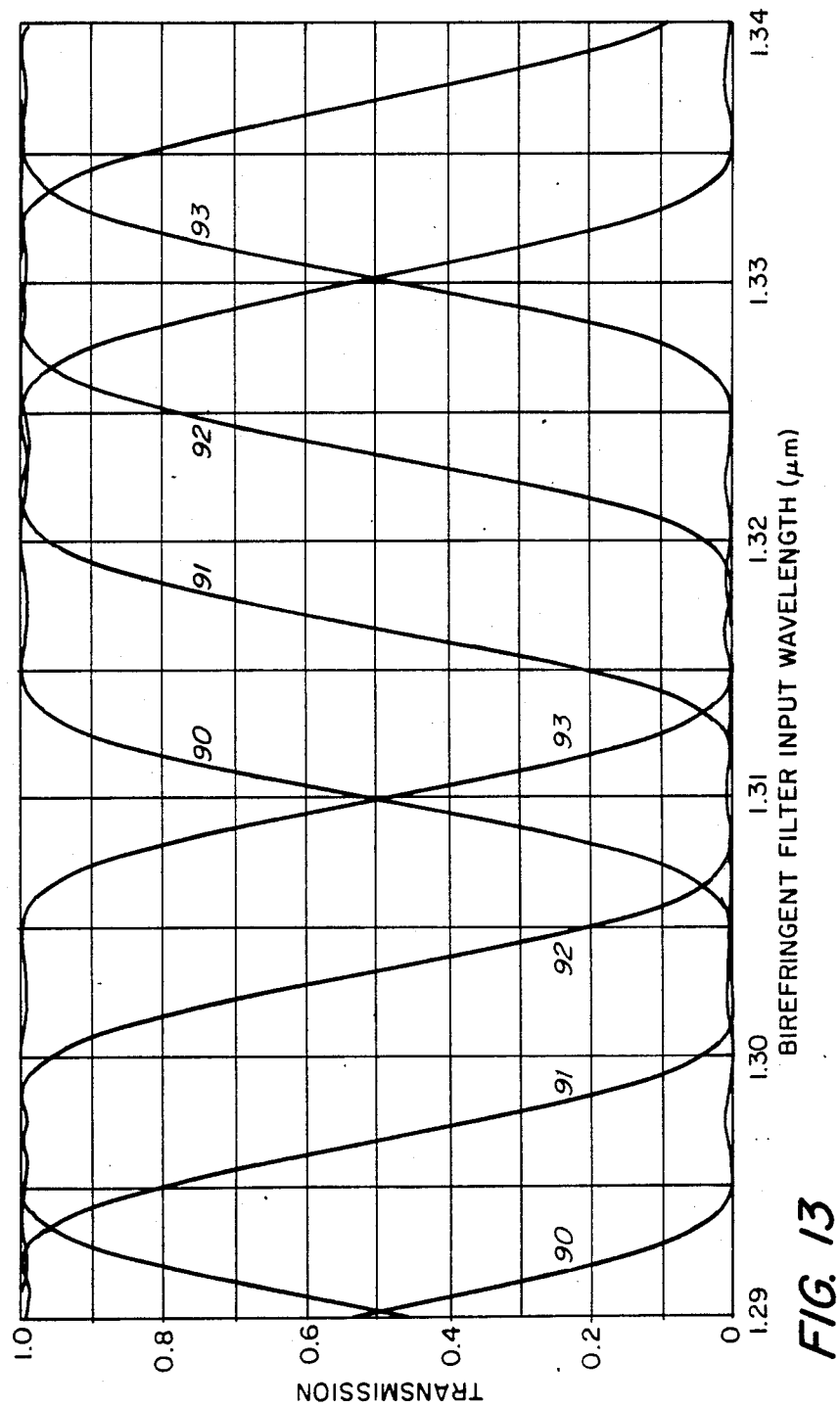
FIG. 13 is a set of curves illustrating a tuned transmission of a filter in accordance with one embodiment of the invention.

The tuned transmission of this filter for $\Delta$ equal to 0, 15, 30, and 45 degrees is shown as curves 90, 91, 92 and 93 of FIG. 13.

Figure 14:
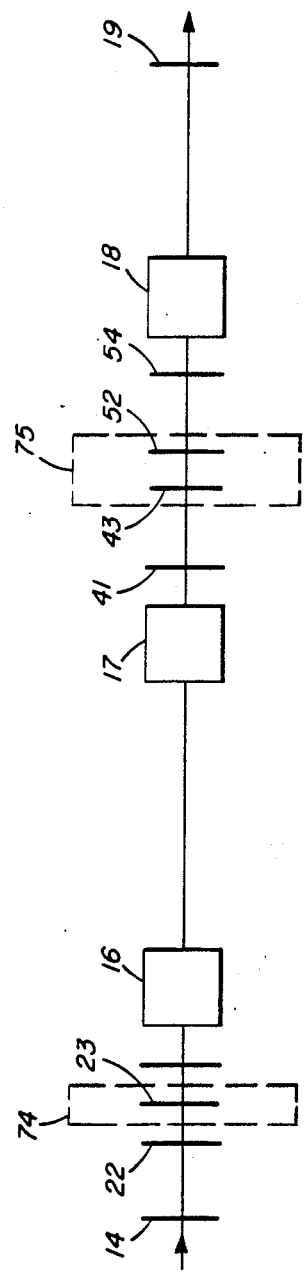
FIG. 14 depicts another embodiment of the invention.

FIG. 14 depicts a tunable birefringent optical filter comprising elements oriented in serial relation along an optical axis including an input polarizer 14, a first quarter-wave plate 22, a half-wave plate 23, a second quarter-wave plate 24, a first birefringent element 16, a second birefringent element 17, a third quarter-wave plate 41, a combination 75 of a fourth quarter-wave plate 43 and a fifth quarter-wave plate 52, a sixth quarter-wave plate 54, a third birefringent element 18, and output polarizer 19, means for rotating said half-wave plate 23 about said optical axis, and means for rotating said combination 75 of fourth quarter-wave plate 43 and fifth quarter-wave plate 52 about said optical axis.

Various modifications can be performed without departing from the spirit and scope of this invention. For example, a couple of complementary two plate tuners may be used to tune two identical birefringent crystal elements of a lossless Solc-type birefringent filter using any of the configurations of FIGS. 8, 9, 10 or 11. The complementary pair may be used in either order to obtain the desired sense of tuning polarity. Input and/or output polarizers may be replaced by polarizing beam splitters to obtain complementary transmission functions for multiplexer operation.

In conclusion, the simultaneous and equal tuning of two birefringent crystal elements of a Solc-type optical filter by the rotation of a single contiguous group of optical components is believed to be new. Further, the simultaneous and equal tuning of two birefringent crystal elements of a Solc-type optical filter by pairs of quarter-wave plates adjacent to each and oriented such that equal and opposite physical rotations between the plates of each pair tunes its adjacent birefringent crystal element in the same direction, without changing the relative orientations of the filter input and output, is also believed to be new.

What is claimed is:

1. A method of simultaneous and equal tuning of two birefringent elements in a birefringent optical filter having an optical axis with birefringent elements and wave plates oriented therealong, by the rotation about said optical axis of a single contiguous group of all optical birefringent elements and wave plates between first and second points along said axis,
    said first point being positioned between first and second adjacent quarter-wave plates immediately adjacent one of said birefringent elements, and
    said second point being positioned between third and fourth adjacent quarter-wave plates immediately adjacent the other of said birefringent elements.

2. The method as recited in claim 1 wherein said first and second adjacent quarter-wave plates immediately follow said one birefringent element, and said third and fourth quarter-wave plates immediately follow said other birefringent element.

3. The method as recited in claim 1 wherein said first and second adjacent quarter-wave plates immediately precede said one birefringent element, and said third and fourth quarter-wave plates immediately precede said other birefringent element.

4. The method as recited in claim 1 wherein said first and second adjacent quarter-wave plates immediately precede said one birefringent element, and said third and fourth quarter-wave plates immediately follow said other birefringent element.

5. The method as recited in claim 1 wherein said first and second adjacent quarter-wave plates immediately follow said one birefringent element, and said third and fourth quarter-wave plates immediately precede said other birefringent element.

6. The method as recited in claim 1 wherein said first quarter-wave plate has its fast axis oriented at an angle of 45 degrees less than the orientation of the fast axis of said one birefringent element, said second quarter-wave plate has its fast axis oriented at an angle of 45 degrees greater than the orientation of the fast axis of said one birefringent element, said third quarter-wave plate has its fast axis oriented at an angle of 45 degrees greater than the orientation of the fast axis of said other birefringent element, and said fourth quarter-wave plate has its fast axis oriented at an angle of 45 degrees less than the orientation of the fast axis of said other birefringent element.

7. The method as recited in claim 1 wherein said first quarter-wave plate has its fast axis oriented at an angle of 45 degrees greater than the orientation of the fast axis of said one birefringent element, said second quarter-wave plate has its fast axis oriented at an angle of 45 degrees less than the orientation of the fast axis of said one birefringent element, said third quarter-wave plate has its fast axis oriented at an angle of 45 degrees less than the orientation of the fast axis of said other birefringent element, and said fourth quarter-wave plate has its fast axis oriented at an angle of 45 degrees greater than the orientation of the fast axis of said other birefringent element.

8. A tunable birefringent optical filter comprising elements oriented along an optical axis including
    an input polarizer,
    a number of pairs of birefringent elements, an adjacent pair of quarter-wave plates adjacent each of said birefringent elements, an output polarizer, and means for tuning said birefringent optical filter by rotating a number of contiguous groups equal to said number of pairs of birefringent elements, said contiguous groups including all birefringent elements and quarter-wave plates between pairs of points, each of said points being between said adjacent pairs of quarter-wave plates.

9. A tunable birefringent optical filter comprising elements oriented in serial relation along an optical axis including an input polarizer,
a first quarter-wave plate,
a half-wave plate,
a second quarter-wave plate,
a first birefringent element,
a second birefringent element,
a third quarter-wave plate,
a combination of a fourth quarter-wave plate and a fifth quarter-wave plate,
a sixth quarter-wave plate,
a third birefringent element,
an output polarizer,
means for rotating said half-wave plate about said optical axis, and
means for rotating said combination of fourth quarter-wave plate and fifth quarter-wave plate about said optical axis.

10. A tunable birefringent optical filter comprising elements oriented in serial relation along an optical axis including an input polarizer,
a first quarter-wave plate,
a half-wave plate,
a second quarter-wave plate,
a first birefringent element,
a combination of a second birefringent element and a third birefringent element having their fast axes at equal orientation angles,
a third quarter-wave plate,
a combination of a fourth quarter-wave plate and a fifth quarter-wave plate,
a sixth quarter-wave plate,
a combination of a fourth birefringent element and a fifth birefringent element having their fast axes at equal orientation angles,
an output polarizer,
means for rotating said half-wave plate about said optical axis, and
means for rotating said combination of fourth and fifth quarter-wave plates about said optical axis.

11. The filter as recited in claim 10 wherein said second birefringent element and said third birefringent element are formed as a first integral birefringent element of double length.

12. The filter as recited in claim 10 wherein said fourth birefringent element and said fifth birefringent element are formed as a second integral birefringent element of double length.

13. The filter as recited in claim 10 including tuning means whereby said half-wave plate is rotated an angle $\Delta$ about said optical axis and said combination of fourth quarter-wave plate and fifth quarter-wave plate is rotated an angle $\rho$ about said optical axis.

14. The filter as recited in claim 13 wherein said angle $\rho$ is four times said angle $\Delta$.

* * * * *